Aug. 25, 1942.                H. R. UBER                  2,294,256
                         RIM ATTACHING DEVICE
                        Filed July 17, 1939           4 Sheets-Sheet 2
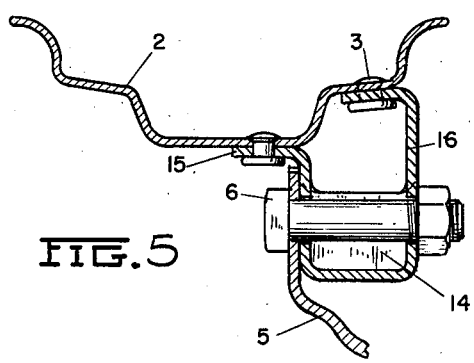
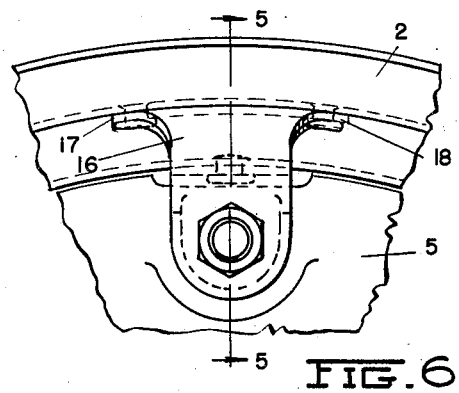
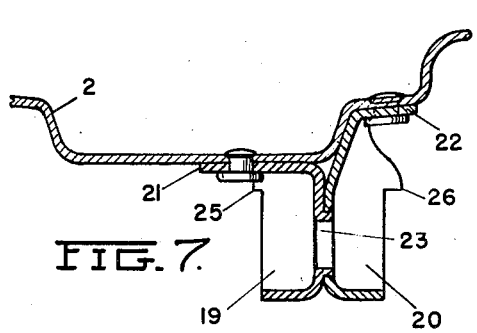
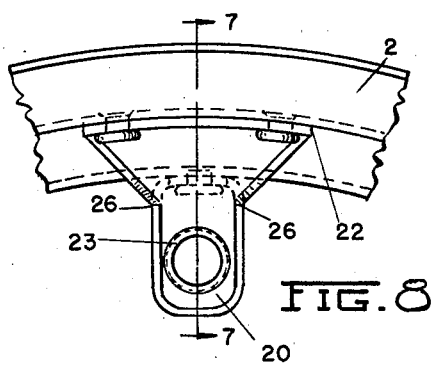
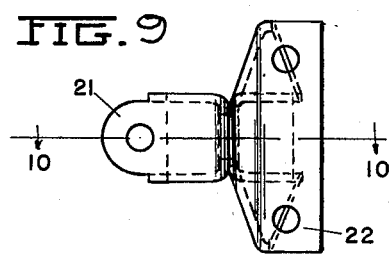
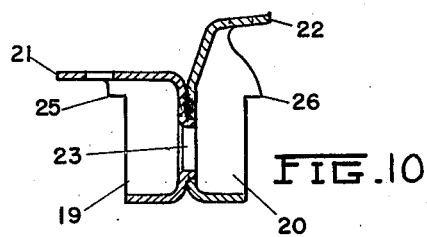
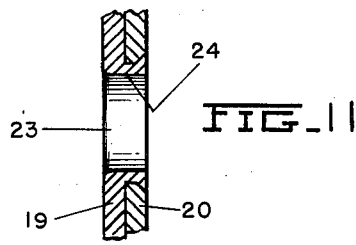
INVENTOR.
HAROLD R. UBER
BY Oberlin, Limbach & Day
ATTORNEYS.

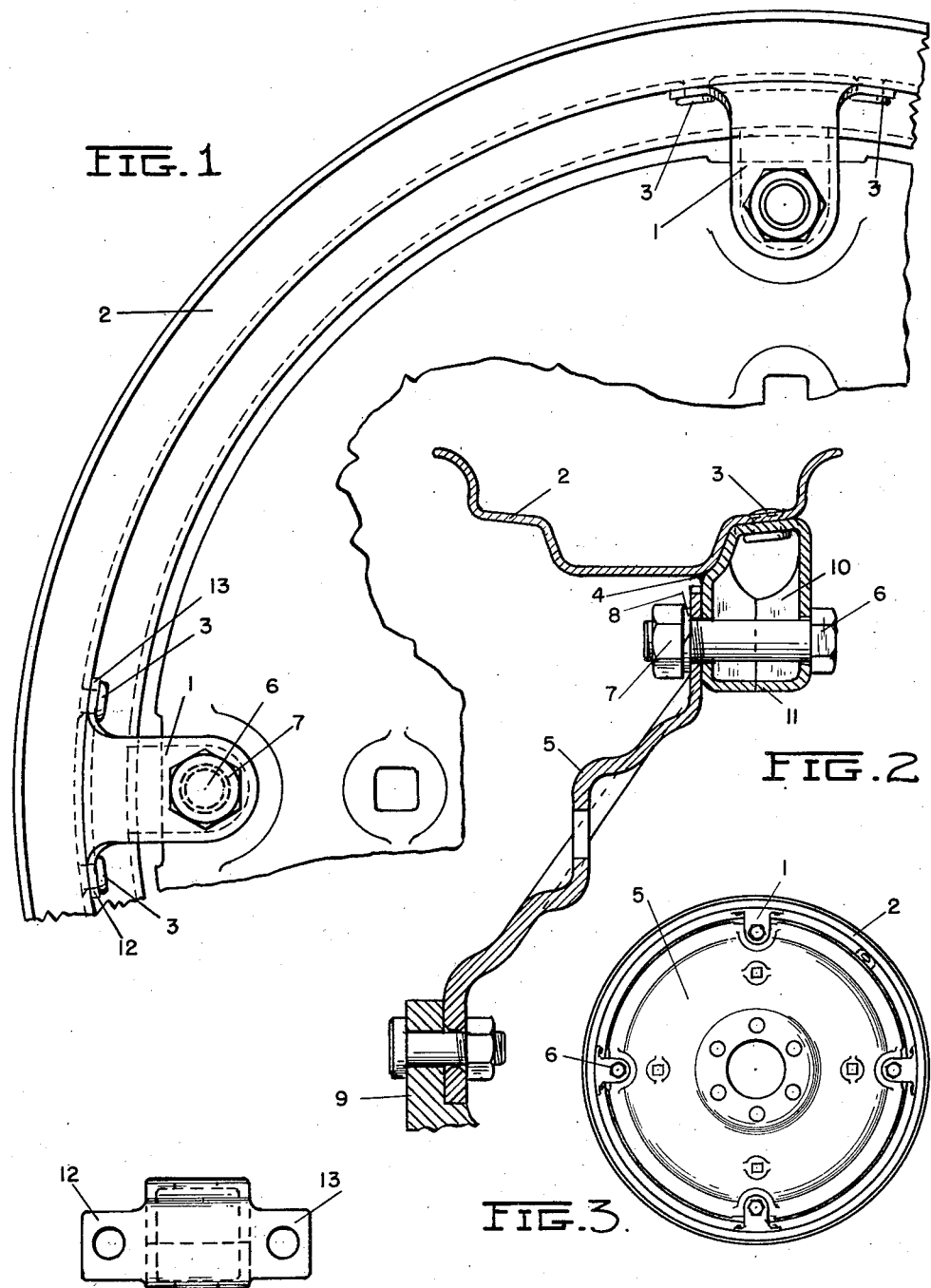

Aug. 25, 1942.  H. R. UBER  2,294,256
RIM ATTACHING DEVICE
Filed July 17, 1939  4 Sheets-Sheet 3
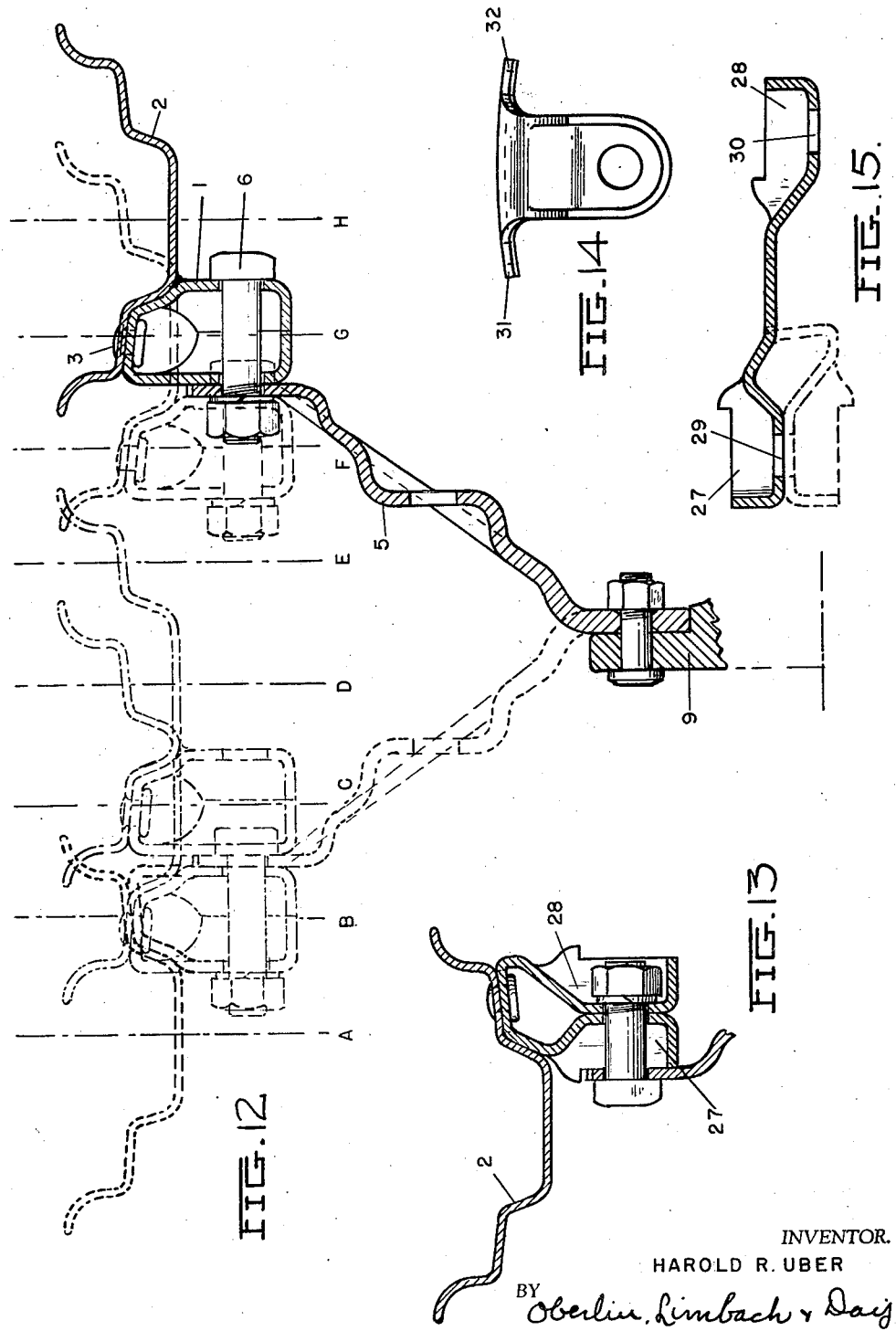
INVENTOR.
HAROLD R. UBER
BY Oberlin, Limbach & Day
ATTORNEYS Aug. 25, 1942.    H. R. UBER    2,294,256
RIM ATTACHING DEVICE
Filed July 17, 1939    4 Sheets-Sheet 4

INVENTOR.
HAROLD R. UBER
BY
ATTORNEYS.

Patented Aug. 25, 1942

2,294,256

UNITED STATES PATENT OFFICE 2,294,256

RIM ATTACHING DEVICE

Harold R. Uber, Lakewood, Ohio, assignor to The Cleveland Welding Company, Cleveland, Ohio, a corporation of Ohio Application July 17, 1939, Serial No. 284,820

7 Claims. (Cl. 301—11)

This invention relates, as indicated, to rim attaching devices adapted to permit variable positioning of such rims with resulting differences in the gauge between a pair of tires mounted thereon.

Obviously, a first requisite of such devices is that they be of sturdy construction affording a firm base for the rims. They should also be designed to permit ready changes of position of the rims with the least expenditure of time and effort. Likewise, since such devices are largely used on farm machinery and especially farm tractors it is important that the cost thereof be reduced to a minimum and that they be adapted to manufacture on a large scale.

It is, therefore, a primary object of this invention to provide a rim attaching device of strong yet simple construction.

Another object is to provide a rim attaching device adapted to permit repositioning of such rims to give different widths of track.

A still further object is to provide a method of manufacturing such devices which will be relatively simple and inexpensive, yet produce a finished article of ample strength for the use intended.

Other objects of this invention will appear as the description proceeds.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a few of the various ways in which the principle of the invention may be employed.

In said annexed drawings—

Fig. 1 is a fragmentary side elevational view of a wheel and rim employing the rim attaching device of this invention, hereinafter referred to as "rim clamp."

Fig. 2 is a fragmentary cross-sectional view of said wheel and rim taken through one of said rim clamps.

Fig. 3 is a side elevational view on a smaller scale of a complete wheel and rim attached thereto by means of such rim clamps.

Fig. 4 is a top view of the clamp shown in cross-section in Fig. 2.

Fig. 5 is a cross-sectional view taken along the line 5—5 on Fig. 6 of another modification of the rim clamp of this invention attached to a rim and bolted to a wheel of which but a fragmentary portion is shown.

Fig. 6 is a side elevational view of the clamp of Fig. 5.

Fig. 7 is a cross-sectional view taken along the line 7—7 on Fig. 8 of another rim clamp formed in accordance with the teaching of this invention.

Fig. 8 is a side elevational view of the clamp of Fig. 7.

Fig. 9 is a top view of another modification of rim clamp made in accordance with my invention.

Fig. 10 is a cross-sectional view along the line 10—10 on Fig. 9.

Fig. 11 is an enlarged fragmentary view of the bolt-hole in the clamp of Fig. 7 showing the manner in which the parts are riveted together.

Fig. 12 illustrates the various rim positions obtainable with the clamp of my invention, the solid line view being a cross-sectional view similar to that of Fig. 2 but with the rim clamp turned in the opposite direction. The figure also indicates the positions obtainable when the wheel is reversed on its hub.

Fig. 13 shows another modification of my new rim clamp in cross-section and attached to a rim.

Fig. 14 is a side elevational view of the clamp of Fig. 13.

Fig. 15 is a cross-sectional view of the formed blank which is bent as indicated by the dotted lines to form the clamp of Fig. 13.

Figure 16:
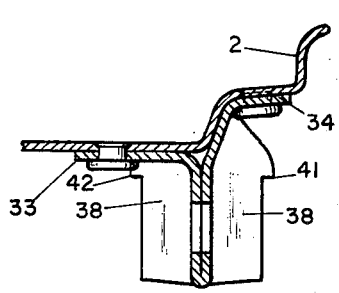
Fig. 16 is a cross-sectional view taken along the line 16—16 on Fig. 17.
Figure 17:
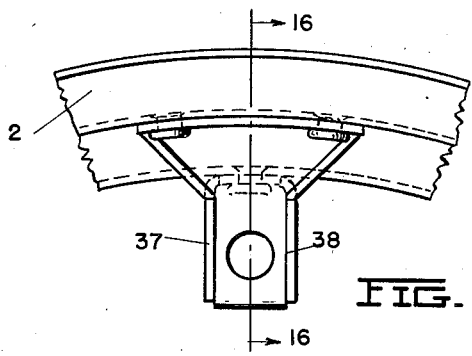
Fig. 17 is a side elevational view of the clamp of Fig. 16.

As best shown in Figs. 1, 2 and 3 the clamps or brackets of this invention such as the clamps 1 here illustrated, are mounted on the rim 2, usually being secured by rivets 3. The attachment may be strengthened by the placing of a little weld metal 4 in the groove between said clamp and rim. The rim is then mounted on the spider of the wheel 5 by means of bolts 6 passing through holes in said wheel and clamps and secured by nuts 7 and lockwashers 8. As described below, the rims may be mounted on the wheels in various positions depending on the gauge of track desired. When changing the rims the wheel 5 is first removed from the hub 9 if the wheel is of the disk type illustrated. If, instead, the wheel is cut out or scalloped between the points of rim attachment, the bolts 6 may be withdrawn, the rim rotated to a point where the clamps may pass and then removed. Of course, if the clamps are attached to the outside of the wheel the rim may be removed without removal of the wheel even if the latter is of the disk type.

As shown in Figs. 1, 2 and 4 one form of rim clamp manufactured in accordance with the teachings of this invention may be produced from sheet metal by a stamping operation which forms side and end flanges such as 10 and 11 respectively, at each end of the blank. The blank is then bent as shown in Fig. 2, holes having been drilled for the passage of bolt 6. As a result of this operation a box-like portion is formed through which the bolt passes giving a strong and rigid support. The edges of such flanges may be welded where they meet to give a still stronger product. Flanges 12 and 13 are attached to the rim 2 by riveting, welding, or both.

Figs. 5 and 6 illustrate a similar device produced by a different stamping operation. Here, a cup-like depression 14 is formed in a blank leaving flanges 15 and 16 on either side thereof. The end of flange 16 is bent and divided into flanges 17 and 18 which are attached to a rim 2 as by riveting.

In Figs. 7 and 8 is illustrated another form of my device in which two stampings having cup-like portions 19 and 20 and flanges 21 and 22 are joined at the bottom sides of said cups. The bolt hole 23 passes through the bottoms of said cup-like portions permitting the use of a shorter bolt than the form of the device shown in Fig. 5, for example. The two stampings may be joined in various ways, as by forming a raised collar 24 about the exterior end of the bolt hole in one of said stampings, fitting said collar in the corresponding hole in the other stamping and peening said collar to rivet said stampings together as shown in Fig. 11. Or, instead of peening, the two stampings may simply be welded together as shown in Fig. 10. The lips of said cup-like portions may be cut away to leave shoulders such as 25 and 26 which fit against the outer periphery of the wheel when said device is mounted thereon.

A similar device permitting the use of a short bolt is illustrated in Figs. 13, 14 and 15. In this case, however, the rim clamp is stamped from a single blank as best shown in Fig. 15, two cup-like depressions 27 and 28 being formed in either end and bolt-holes 29 and 30 drilled therein. The stamping is then bent as indicated by the dotted lines so that said bolt holes register and mounted on the rim as shown in Fig. 13, usually with rivets passing through flanges 31 and 32.

Figure 18:
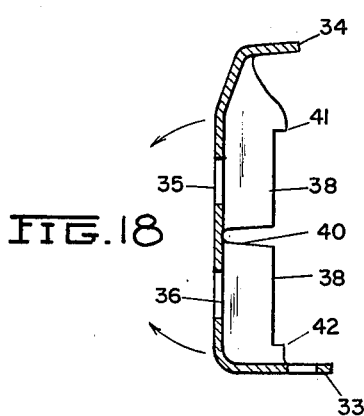
Fig. 18 is a cross-sectional view taken along the line 18—18 on Fig. 19 of the formed blank prior to its bending into the rim clamp of Fig. 16.
Figure 19:
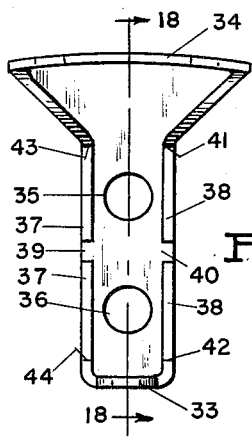

Fig. 18 shows a blank which has been stamped and drilled, ready to be bent into the device of Fig. 16. In this case the sides and ends of the blank are flanged, one end 33 being drilled for a single rivet and the other end 34 more widely flanged and drilled for two rivets for attachment to the rim 2. Bolt holes 35 and 36 are drilled in the flat of the stamping and the side flanges 37 and 38 have cut-away portions 39 and 40 permitting the stamping to be bent as shown in Fig. 16. Shoulders 41 and 42 and corresponding shoulders 43 and 44 on the flanged side 37 are cut out to fit the outer periphery of the wheel when the device is mounted thereon.

It will be noted that in each of the rim attaching devices above described, there have been provided a body portion having paired walls substantially normal to the plane of the wheel and also paired walls substantially parallel to the plane of the wheel through which the attaching bolt passes. Said body portion is provided with an integral portion extending substantially axially of the wheel and adapted to be secured to said rim. Such a structure is obviously well adapted to withstand violent stresses and strains.

As best illustrated in Figs. 5, 7, and 16 the device of this invention, when employed in conjunction with drop-center rims, is desirably provided with two flanged portions for attachment to the rim, one of said flanged portions being adapted for attachment to the drop-center portion of the base of the rim and another of said flanged portions being adapted for attachment to the base of such rim adjacent a bead retaining flange thereof. Such flanged portions are likewise disposed so as to position the structure to one side of the equatorial plane of such rim for the purpose described below.

As indicated above, a number of different widths of track may be obtained by repositioning said rim attaching devices on the wheels and/or turning the wheels around. In Fig. 12 it is shown how eight positions may be obtained, the vertical lettered dot and dash lines indicating the rim centers or equatorial planes thereof. The E position is obtained by reversing the rim and clamp on the wheel as shown in solid line, the wheel only being turned around. The F position likewise corresponds to the C position shown in dotted line. The B position is obtained by attaching the rim in the G position and turning the wheel around into dotted line position.

The other modifications of my device herein described may all obviously be employed in like manner. By following the teachings of this invention a rim attaching device may be produced at much lower cost than by the methods now generally employed and yet have all the strength and rigidity required.

Other modes of applying the principle of the invention may be employed, change being made as regards the details described, provided the features stated in any of the following claims, or the equivalent of such, be employed.

I therefore particularly point out and distinctly claim as my invention:

1. A rim attaching device comprising two sheet metal structures having cup-like portions and flanges, said structures being joined together at the bottom-sides of such cup-like portions and said flanges being positioned for attachment to a rim, and a bolt-hole through the bottoms of said cup-like portions for attachment to a wheel.

2. A rim attaching device comprising two sheet metal structures having cup-like portions and flanges, a hole in the bottom of one of said cup-like portions having a raised collar about the exterior end thereof, a hole in the bottom of the other cup-like portion in which said collar is fitted, and a peened lip on said collar to hold said structures together in rivetal attachment.

3. A rim attaching device comprising two sheet metal structures having cup-like portions and flanges, a bolt-hole in the bottom of one of said cup-like portions, a raised collar about the exterior end thereof, and a hole in the bottom of the other cup-like portion in which said collar is fitted, said structures being welded together.

4. A rim attaching device comprising a sheet metal member, cup-like portions in said member, said member being bent so that the bottoms of said cup-like portions are adjacent, and a bolt-hole through said adjacent bottoms for attachment to a wheel.

5. In combination, a rim and means for securing said rim to a wheel, said means comprising a separate sheet metal structure having wall portions parallel to each other, bolt holes in alignment through such wall portions for attachment to a wheel, and flanged portions in planes substantially normal to such wall portions attached to said rim and disposed to position said structure to one side of the equatorial plane of said rim, one of said wall portions being longer than the other thus disposing said flanges in different planes.

6. In combination, a rim and means for securing said rim to a wheel, said means comprising a separate sheet metal structure having flanged portions adjacent each other, a bolt hole through such flanged portions for attachment to a wheel, flanges extending in planes normal to said first-named flanged portions for spacing said first-named flanged portions from such wheel, and other flanged portions attached to said rim, said last named flanged portions being disposed to position said first-named flanged portions to one side of the equatorial plane of said rim.

7. In combination, a drop-center rim and means for securing said rim to a wheel, said means comprising a separate sheet metal structure having spaced wall portions parallel to each other, bolt holes in alignment through such wall portions for attachment to a wheel, and flanged portions attached to said rim, one of said flanged portions being attached to the drop center portion of the base of said rim and another of said flanged portions being attached to the base of said rim adjacent a bead retaining flange thereof to position one of said wall portions at a greater distance from the equatorial plane of said rim than the other of said wall portions.

HAROLD R. UBER.